United States Patent
Silberkuhl

(10) Patent No.: US 10,543,524 B2
(45) Date of Patent: Jan. 28, 2020

(54) THREAD ROLLING TOOL

(71) Applicant: Philipp Silberkuhl, Wuppertal (DE)

(72) Inventor: Philipp Silberkuhl, Wuppertal (DE)

( * ) Notice: Subject to any disclaimer, the term of this patent is extended or adjusted under 35 U.S.C. 154(b) by 573 days.

(21) Appl. No.: 15/118,532

(22) PCT Filed: Jul. 28, 2014

(86) PCT No.: PCT/EP2014/002053
§ 371 (c)(1),
(2) Date: Aug. 12, 2016

(87) PCT Pub. No.: WO2015/120868
PCT Pub. Date: Aug. 20, 2015

(65) Prior Publication Data
US 2017/0056957 A1  Mar. 2, 2017

(30) Foreign Application Priority Data

Feb. 13, 2014 (DE) .......... 10 2014 202 648

(51) Int. Cl.
*B21H 3/04* (2006.01)
*B23G 9/00* (2006.01)

(52) U.S. Cl.
CPC ............ *B21H 3/048* (2013.01); *B21H 3/04* (2013.01); *B21H 3/042* (2013.01); *B23G 9/009* (2013.01); *B21H 3/044* (2013.01)

(58) Field of Classification Search
CPC ... B23G 5/04; B23G 5/10; B23G 7/00; B23G 7/02; B23G 2200/06; B23G 2200/08; B23G 2200/42; B21H 3/04; B21H 3/042; B21H 3/044; B21H 3/046; B21H 3/048; B21H 3/02; B21H 3/022; B21H 3/08; B21D 1/02; B21K 1/56
See application file for complete search history.

(56) References Cited

U.S. PATENT DOCUMENTS

| | | | |
|---|---|---|---|
| 1,983,922 A | 12/1934 | Ruppel | |
| 4,498,322 A * | 2/1985 | Toropov | B21H 3/08 72/118 |
| 4,942,752 A | 6/1990 | Helfman | |
| 2008/0010807 A1* | 1/2008 | Fujii | B21H 3/04 29/558 |
| 2012/0186318 A1* | 7/2012 | Behrens | B21H 3/02 72/211 |

FOREIGN PATENT DOCUMENTS

| | | | |
|---|---|---|---|
| CH | 420 031 A | 9/1966 | |
| DE | 561304 C * | 10/1932 | ............. B21H 3/042 |
| DE | 29 44 999 A1 | 5/1981 | |
| DE | 10 2008 019 437 A1 | 10/2009 | |
| DE | 10 2009 049 580 A1 | 4/2011 | |
| WO | 2011/044970 A1 | 4/2011 | |

OTHER PUBLICATIONS

EPO Machine Translation of Description of DE-561304-C (Year: 2019).*

* cited by examiner

*Primary Examiner* — Pradeep C Battula
(74) *Attorney, Agent, or Firm* — W&C IP

(57) ABSTRACT

A thread rolling tool for rolling or repairing a thread has a tool body, a profiled roller, and at least one counter roller. The profiled roller and the at least one counter roller are mounted on the tool body. Preferably, at least one of the profiled roller and the at least one counter roller is mounted so that it is axially displaceable. The profiled roller has a profiled roller profile that has a pitch.

11 Claims, 2 Drawing Sheets

THREAD ROLLING TOOL

Figure 1:
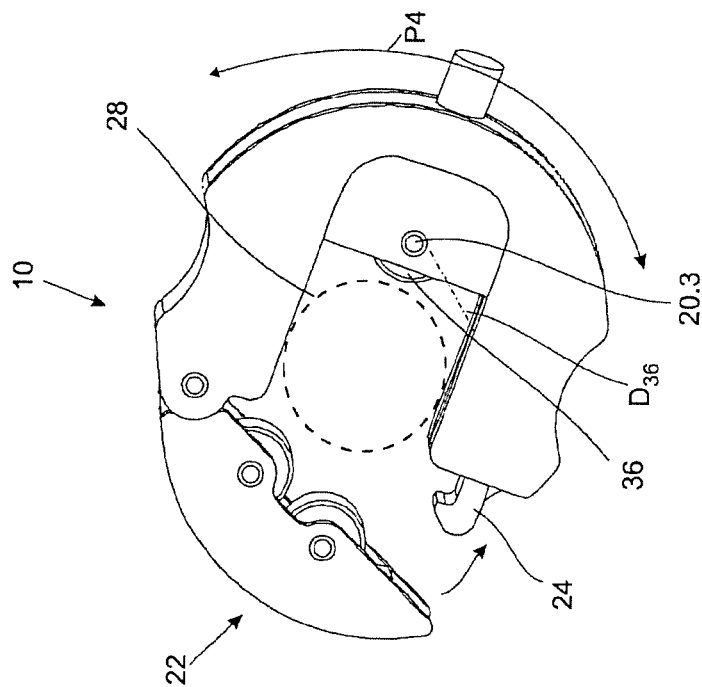

The invention relates to a thread rolling tool for rolling or repairing a thread, the thread rolling tool having a tool body, a profiled roller that is mounted on the tool body, and at least one counter roller that has a counter roller rotational axis and is mounted on the tool body.

A thread rolling tool of this sort is described, for example, in DE 2008 019 437 A1. This thread rolling tool features counter profiles that comprise a level profile, with an angle of inclination of the profiling tool being adjustable.

It has transpired that a tool of this sort causes problems during use as the adjustment of the thread rolling tool to the thread that is present in each case is relatively complex.

A thread rolling tool according to the preamble is described in DE 10 2009 049 580 A1 with a profiled roller and two counter rollers that can be placed on top of one another, the rotational axis of the profiled roller being arranged at an angle to the axis of the counter rollers. The disadvantage of this type of tool is that it must be adjusted specifically for every thread that is to be repaired or rolled.

The invention aims to suggest an improved thread rolling tool.

The invention solves the problem by means of a thread rolling tool according to the preamble with the profiled roller and/or at least one counter roller being mounted so as to be axially displaceable. The feature of the counter roller being mounted so as to be axially displaceable should be understood to mean that it is mounted such that it can be moved in the axial direction in relation to its rotational axis.

In other words, a maximum of one roller is not axially displaceable. Here, the term roller should be understood to mean the profiled roller or the counter roller.

The advantage of the invention is that threads of different pitches and/or nominal sizes can be rolled with the same thread rolling tool. The axial displacement means that all rollers, namely the profiled roller and at least one counter roller, can run along the grooves of the thread regardless of the exact pitch and diameter of the thread. The thread rolling tool according to the invention is thus particularly universally applicable.

A further advantage is that the tool can be used in such a way that renders it especially easy to repair. It is namely sufficient to initially insert the profiled roller in the available thread and then to gently fix the at least one counter roller to the available thread. As a result of the axial displacement, the at least one counter roller automatically occupies the correct position. The thread rolling tool according to the invention can therefore also be used in locations that are difficult to access.

Within the scope of the present description the term tool body should be understood particularly to mean a structure that is so stable that forces which occur during the rolling and/or repair of a thread can be absorbed by the profiled rollers.

It is possible but not necessary for the profiled roller and the at least one counter roller to be structurally identical. In particular, as a general rule, the profiled roller and the at least one counter roller are no different with regards to their effect on the work piece; the terms serve only to differentiate between the two objects. Of course, it is however also possible that the profiled roller and the at least one counter roller are designed differently. For example, the at least one counter roller may have more grooves than the profiled roller.

It is beneficial if the profiled roller and/or the at least one counter roller is made out of hardened steel or another hard metal. For example, the profiled roller and/or the at least one counter roller is made of a metal that has a Rockwell hardness of at least 45 HRC. This hardness relates to the hardness on the surface of the roller. It is possible that the hardness inside the component is lower.

The thread rolling tool is preferably designed as a hand tool, meaning that it can be held and, where appropriate, operated with one hand.

The profiled roller and/or the at least one counter roller is preferably axially displaceable about an axial play, the axial play being at least 0.25 millimetres, especially at least 0.4 millimetres, for example at least 0.6 millimetres. The axial play is the distance between the extreme positions along the rotational axis of each roller that the roller can occupy without plastic deformation.

According to a preferred embodiment, the tool body has a base body and an arm, with at least one of the rollers, especially the profiled roller, being mounted on the base body, at least one of the rollers, especially the at least one counter roller, being fixed to the arm and the arm being designed such that it can be put into a locking position, in which the tool body is locked around a work piece, and an open position, in which the arm can be moved relative to the base body so as to render the work piece removable. The feature that the arm is locked around the work piece should be particularly understood to mean that a ring-shaped, although not necessarily a circular ring-shaped, closed flow of forces runs through the tool body that encloses the work piece. In this case, the connection between arm and base body absorbs at least a part of the force that is exerted onto the work piece on the rollers that is to be rolled or repaired. The advantage of this embodiment is that it does not require much space. The closed flow of forces means that the tool body can have a low flexural strength and still safely absorb the necessary forces.

Alternatively, the rollers are fixed to a U-shaped tool body that is designed in such a way that the work piece can be inserted into a work space between the rollers. In this case it is especially advantageous if the thread rolling tool comprises a setting device, described in more detail below. The U-shaped tool body is designed to be so rigid that it bears any forces that occur during the rolling and/or repairing of the thread without plastically deforming.

The profiled roller preferably includes a profiled roller rotational axis which forms a maximum offset angle of 2° with the counter roller rotational axis. The offset angle is preferably as small as possible, in particular fundamentally 0°. This enables a simple production of the thread rolling tool and a simple operation.

Of course, the fact that the offset angle exists does not mean that the counter roller rotational axis and the profiled roller rotational axis intersect. The offset angle can be calculated according to the mathematical rule for calculating an angle using the direction vectors of the vectorial depiction of rotational and longitudinal axes, the direction vectors being especially selected such that the offset angle is a maximum of 90°. The offset angle is always indicated positively, for example a mathematical angle between a rotational and longitudinal axis of −0.5° is therefore considered to be an offset angle of 0.5°.

The thread rolling tool preferably comprises a second counter roller, which has a second counter roller rotational axis that runs parallel to the counter roller rotational axis. The feature of the second counter roller rotational axis and the counter roller rotational axis running parallel should be especially understood to mean that an angle between the two is smaller than 2°, in particular smaller than 1°. This type of thread rolling tool requires a small torque to activate it so that it can be operated by hand.

If the thread rolling tool has only one counter roller, it is advantageous if it has a counter element which exerts the force needed for rolling onto the profiled roller and the one counter roller. For example, this counter element is partially cylindrical and preferably threaded.

It is beneficial if the arm is mounted to the base body in such a way that it can pivot. A pivoted mounting allows for an especially simple assembly of the thread rolling tool to the work piece. Alternatively, it is possible that the arm is designed in such a way that it can be completely separated from the base body. It is then possible to fix the arm to the base body by means of two snap connections or one snap connection of a connection that engages on the reverse side.

It is particularly beneficial if the arm can be connected to the base board by means of a snap connection. This facilitates the fixing of the thread rolling tool to the work piece, which is especially useful if the work piece is not easily accessible.

The profiled roller preferably has a profiled roller profile that has a pitch. The profiled roller profile can, in particular, be described as a curve which runs helically around the screw axis. The feature that the profiled roller profile has a pitch should be especially understood to mean that an imaginary body, which constantly moves in the base of the grooves of the profiled roller profile along the profiled roller profile, runs in a helix about the rotational axis of the profiled roller.

In particular the counter roller has an axial play that at least corresponds to the pitch. This ensures that the counter roller can assume the necessary axial position for every conceivable thread.

The at least one counter roller preferably has a counter roller profile that has the same pitch as the profiled roller profile. If there are two or more counter rollers, all the counter rollers preferably have the same pitch as the profiled roller. This should be understood to mean that all the rollers can run in one thread.

It is advantageous if all rollers have the same diameter. The rollers preferably have a cylindrical base design. In other words, an imaginary cylinder exists which nestles against the roller from the outside.

According to a preferred embodiment, the thread rolling tool has a setting device, in particular a set screw, by means of which an inner diameter of a pitch circle can be adjusted, the pitch circle being the one circle in which the work piece comes into contact the with profiled roller and the at least one counter roller during operation. This setting device is particularly advantageous when it interacts with a—as intended according to a preferred embodiment—detachable connection between the arm and the base body. In this case it is possible to initially close the thread rolling tool around the work piece by connecting the arm with the base body. The actuator is subsequently positioned so that the profiled roller and the at least one counter roller are in the positions required to roll and/or repair the thread.

At least one of the profiled rollers is preferably mounted so as to be rendered removable. In other words, the profiled roller is mounted so as to be rendered removable and/or the first counter roller is mounted so as to be rendered removable and/or the second counter roller, if present, is mounted so as to be rendered removable. This has the advantage that a large variety of threads with different pitches and/or nominal sizes can be rolled and repaired with the same tool set, which comprises a tool body and a number of rollers.

In the following, the invention will be explained in more detail in the attached drawings. They show FIG. 1 a perspective view of a thread rolling tool according to the invention, FIG. 2 the tool according to FIG. 1, FIG. 3 the thread rolling tool according to FIGS. 1 and 2 where the tool body is locked, and FIG. 4 a further view in which the snap mechanism can be seen.

FIG. 1 depicts a thread rolling tool 10 according to the invention that comprises a tool body 12, a first counter roller 14.1 and a second counter roller 14.2. The tool body 12 comprises a base body 16 to which an arm 18 is fixed so as to be rendered movable.

The tool body 12 has a first shaft 20.1 onto which the first counter roller 14.1 is mounted such that it can be rotated about a counter roller rotational axis $D_{14.1}$. A second counter roller rotational axis $D_{14.2}$, about which the second counter roller 14.2 can be rotated, runs, in the technical sense of the word, parallel, i.e. parallel within the scope of a predetermined tolerance, to the counter roller rotational axis $D_{14.1}$. The second counter roller 14.2 is mounted on a second shaft 20.2 of the tool body 12. The counter rollers 14.1, 14.2 are mounted on their respective shafts 20.1, 20.2 so as to be axially displaceable, as indicated by the arrows P1 and P2.

FIG. 1 shows that the arm 18 is connected to the base body 16 by means of a snap connection in such a way that it can be reversibly connected. In addition, the base body 16 comprises a preloaded snap hook 24 which can engage with a fixing element 26. When connected, the arm 18 and the base body 16 enclose a internal space in which a work piece 28 (see FIG. 2) can be arranged. FIG. 1 shows an opening position in which the arm 18 can be removed relative to the base board 16 in such a way that the work piece can be removed.

FIG. 1 also shows a setting device 30 which comprises a set screw 32. The set screw 32 interacts with a thread, not depicted in FIG. 1, so that a third shaft 20.3 can be positioned on the two counter rollers 14.1, 14.2. In addition, the third shaft 20.3 is mounted on a slide 34 onto which the set screw 32 acts.

FIG. 1 shows that the counter rollers 14.1, 14.2 have a profile that has a pitch.

Figure 2:
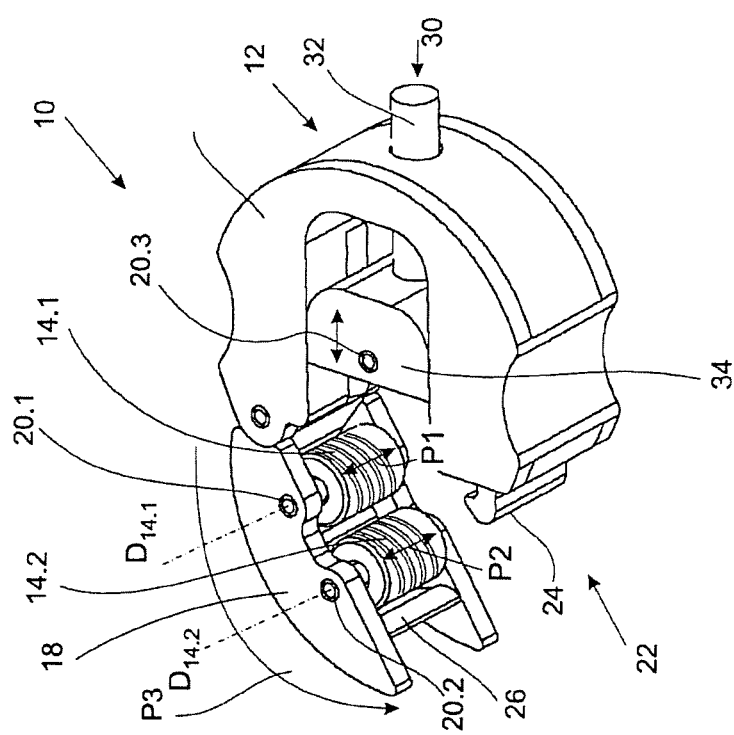

FIG. 2 depicts another view of the thread rolling tool 10 according to FIG. 1. It should be noted that the thread rolling tool 10 comprises a profiled roller 36, which is mounted such that it can rotated about the shaft 20.3. The profiled roller 36 has a profiled roller rotational axis $D_{36}$ which forms a maximum angle of 2° with the counter roller rotational axis $D_{14.1}$ and/or the second counter roller rotational axis $D_{14.2}$. It is especially beneficial if the three axes of rotation run parallel to one another with the highest possible accuracy.

FIG. 2 schematically depicts a work piece 28 that is to be processed with the thread rolling tool 10. In addition, the arm 18 is locked as indicated by the arrow P3 until the snap connection 22 engages. The profiled roller 36 is then adjusted by means of the actuator 30. The thread rolling tool 10 is subsequently rotated about the longitudinal axis of the work piece 28, as shown by the arrow P4, thereby rolling a thread or repairing an existing thread.

Figure 3:
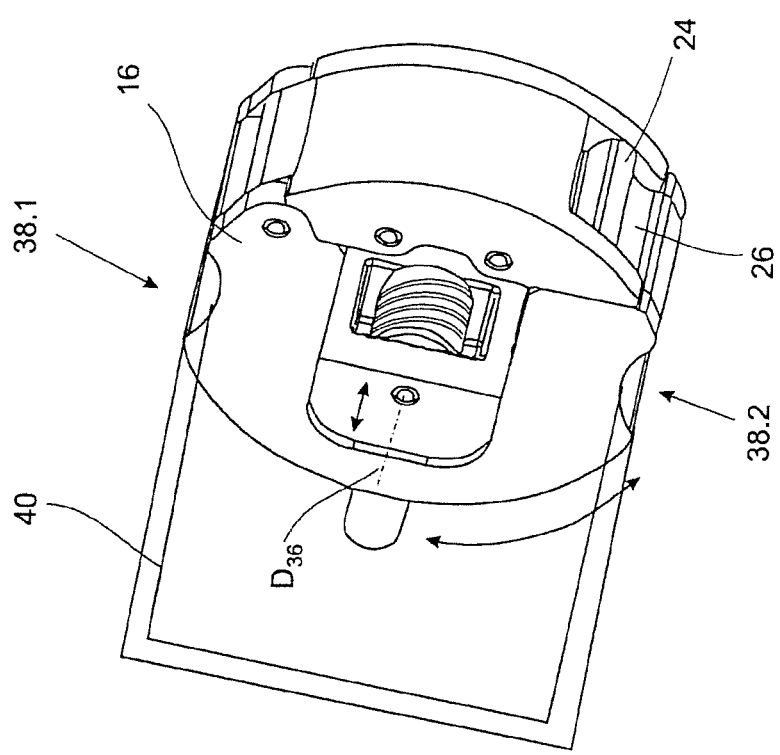

FIG. 3 depicts the thread rolling tool 10 in the locked state, in which the arm 18 is securely connected to the base body 16. In this state, the snap hook 24 engages with the element 26. FIG. 3 also shows two indentations 38.1, 38.2, which positively interact with a hand piece or adapter 40. The hand piece 40 makes it possible to rotate the base body 16 by hand or with a motor in an axial distance relating to the profiled roller rotational axis $D_{36}$ so that threads that are difficult to access can also be repaired or rolled. The indentation 38 is an embodiment of a coupling device. Alternatively, the thread rolling tool 10 may comprise a hole or a different structure that enables a positive-locking connection with the adapter 40.

Figure 4:
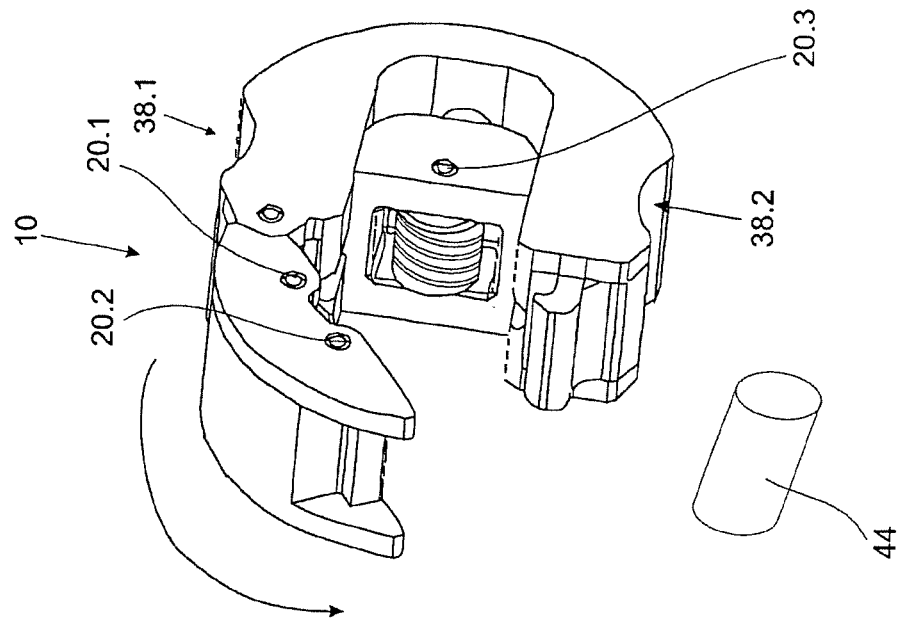

FIG. 4 depicts another view of the thread rolling tool 10. The shafts 20.1, 20.2, 20.3 are fixed to the tool body so as to be detachable, for example the shafts are screwed in. By rotating the shafts 20.1, 20.2, 20.3, for example with an Allen key that interacts with an inner hexagonal depression in the respective shaft, the shaft can be separated from the rest of the tool body 12. This allows for the exchange of the rollers, i.e. the counter rollers 14.1, 14.2 and the profiled roller 36. However, it is also possible that not all rollers are designed to be exchanged, but rather only the profiled rollers for example.

The shafts 20.1, 20.2, 20.3 and the rollers 14.1, 14.2, 36 are made of hardened steel, for example. It is possible, but in general not necessary, for the rollers to be mounted to their respective shafts by means of bearings, for example a ball bearing or needle roller bearing. However, as a general rule, it is sufficient for the rollers to only be connected to the respective shaft by means of a frictional joint.

FIG. 4 also schematically depicts a thread rolling tool set 42 that, alongside the thread rolling tool 10, contains at least one replacement roller 44, which can be installed in the thread rolling tool 10 instead of one of the rollers, namely one of the counter rollers 14.1, 14.2 or the profiled roller 36.

REFERENCE LIST

10 thread rolling tool
12 tool body
14 counter roller
16 base body
18 arm
20 shaft
22 snap connection
24 snap hook
26 fixing element
28 work piece
30 setting device
32 set screw
34 slide
36 profiled roller
38 indentation
40 hand piece/adapter
42 thread rolling tool set
44 replacement roller
$D_{14.1}$ counter roller rotational axis
$D_{14.2}$ second counter roller rotational axis
$D_{36}$ profiled roller rotational axis

The invention claimed is:

1. A thread rolling tool for rolling and/or repairing a thread, comprising:
   (a) a tool body,
   (b) a shaft and a profiled roller that is mounted to the tool body by means of the shaft, wherein the profiled roller has a rotational axis, and
   (c) at least one counter roller, which
      has a counter roller rotational axis and is mounted to the tool body,
   (d) wherein the profiled roller and/or the at least one counter roller is mounted so that it is axially displaceable with respect to the shaft, and
   (e) wherein the profiled roller has a profiled roller profile that has a pitch and runs in a helix about the rotational axis of the profiled roller.

2. Thread rolling tool according to claim 1, wherein
   (a) the tool body
      has a base body and
      an arm,
   (b) at least one of the profiled roller or at least one counter roller is mounted on the base body,
   (c) at least one of the profiled roller or at least one counter roller is fixed to the arm, and
   (d) the arm is configured to be put in
      a locking position, in which the tool body is locked around a work piece, and
      an opening position in which the arm can be moved relative to a base board in such a way that the work piece can be removed.

3. Thread rolling tool according to claim 2 wherein the arm is connected to the base body by a snap connection.

4. Thread rolling tool according to claim 1 wherein the profiled roller has a profiled roller rotational axis and both the profiled roller rotational axis and the counter roller rotational axis comprise a maximum offset angle of 2°.

5. Thread rolling tool according to claim 1 wherein the at least one counter roller includes at least a second counter roller which has a second counter roller rotational axis that runs parallel to the counter roller rotational axis.

6. Thread rolling tool according to claim 1 further comprising a setting device by means of which an inner diameter of a pitch circle is adjustable, wherein the pitch circle is a circle in which a work piece comes into contact with the profiled roller and the at least one counter roller during operation.

7. Thread rolling tool according to claim 1 wherein the profiled roller is removably mounted and/or the at least one counter roller includes a first counter roller and a second counter roller wherein
   the first counter roller is removably mounted and/or
   the second counter roller is removably mounted.

8. Thread rolling tool according to claim 1 further comprising
   a coupling device and
   an adapter for interacting positively with the coupling device so that the base body is rotatable from an axially distanced point.

9. Thread rolling tool set; comprising:
   (i) a thread rolling tool according to claim 1 with at least one of the rollers being removable, and
   (ii) at least one replacement roller that can be used in the thread rolling tool in place of the removable roller.

10. Thread rolling tool according to claim 1, wherein the profiled roller has a profiled roller rotational axis which forms a maximum angle of 2° with the counter roller rotational axis.

11. Thread rolling tool according to claim 10, wherein the profiled roller rotational axis and the counter roller rotational axis of the at least one counter roller run parallel to one another.

* * * * *